(12) United States Patent
Lu et al.

(10) Patent No.: US 10,372,275 B2
(45) Date of Patent: Aug. 6, 2019

(54) INTERACTIVE HIGH-CLARITY GLASS ELECTRONIC WHITEBOARD

(71) Applicant: Opton (Shunchang) Optics Co., LTD., Fujian (CN)

(72) Inventors: Zhang Lu, Fujian (CN); Qiming Yu, Fujian (CN); Jicai Zu, Fujian (CN)

( * ) Notice: Subject to any disclaimer, the term of this patent is extended or adjusted under 35 U.S.C. 154(b) by 43 days.

(21) Appl. No.: 15/262,012

(22) Filed: Sep. 12, 2016

(65) Prior Publication Data

US 2017/0168606 A1    Jun. 15, 2017

(30) Foreign Application Priority Data

Nov. 20, 2015   (CN) .......................... 2015 1 0805964
Apr. 29, 2016   (CN) .......................... 2016 1 0276838

(51) Int. Cl.
*B32B 3/08* (2006.01)
*B32B 27/06* (2006.01)
(Continued)

(52) U.S. Cl.
CPC ................ *G06F 3/044* (2013.01); *B32B 3/08* (2013.01); *B32B 3/12* (2013.01); *B32B 5/02* (2013.01); *B32B 7/04* (2013.01); *B32B 9/005* (2013.01); *B32B 15/043* (2013.01); *B32B 15/08* (2013.01); *B32B 15/20* (2013.01); *B32B 17/00* (2013.01); *B32B 17/061* (2013.01); *B32B 17/067* (2013.01); *B32B 17/10* (2013.01); *B32B 27/06* (2013.01); *B43L 1/00* (2013.01); *B43L 1/002* (2013.01); *B43L 1/06* (2013.01); *B32B 2250/05* (2013.01); *B32B 2255/00* (2013.01); *B32B 2307/40* (2013.01); *B32B 2307/408* (2013.01); *B32B 2307/4023* (2013.01); *B32B 2307/41* (2013.01); *B32B 2307/412* (2013.01);
(Continued)

(58) Field of Classification Search
CPC ................ G06F 3/044; B32B 3/08–12; B32B 2307/536–584
See application file for complete search history.

(56) References Cited

U.S. PATENT DOCUMENTS

2012/0176345 A1*   7/2012   Ye ........................... G06F 3/041
                                                                345/175
2014/0154661 A1*   6/2014   Bookbinder ............ B43L 1/002
                                                                434/408
(Continued)

FOREIGN PATENT DOCUMENTS

CN           10346551 A    * 12/2013
CN           204759385 U   * 11/2015
KR           101597973 B1  *  2/2016

*Primary Examiner* — Chanh D Nguyen
*Assistant Examiner* — Karin Kiyabu
(74) *Attorney, Agent, or Firm* — Prakash Nama; Global IP Services, PLLC

(57) ABSTRACT

An interactive high-clarity glass electronic whiteboard having a writing board body; the writing board body includes a base board and an ultra-thin tempered glass. The front of the base board attaches with the ultra-thin tempered glass. The attaching surface of the ultra-thin tempered glass attaching the base board is adhered with a non-transparent interlayer. A non-transparent coating is adhered to an attaching surface of the ultra-thin tempered glass attaching the base board A writing surface of the ultra-thin tempered glass is a matte surface with anti-glare treatment.

11 Claims, 2 Drawing Sheets

(51) Int. Cl.
  *G06F 3/044*    (2006.01)
  *B32B 3/12*     (2006.01)
  *B32B 17/06*    (2006.01)
  *B32B 17/10*    (2006.01)
  *B43L 1/00*     (2006.01)
  *B43L 1/06*     (2006.01)
  *B32B 5/02*     (2006.01)
  *B32B 7/04*     (2019.01)
  *B32B 9/00*     (2006.01)
  *B32B 15/04*    (2006.01)
  *B32B 15/08*    (2006.01)
  *B32B 15/20*    (2006.01)
  *B32B 17/00*    (2006.01)

(52) U.S. Cl.
  CPC ..... *B32B 2307/50* (2013.01); *B32B 2307/536* (2013.01); *B32B 2307/584* (2013.01); *B32B 2307/732* (2013.01); *B32B 2307/75* (2013.01); *B32B 2311/24* (2013.01); *B32B 2457/208* (2013.01); *G06F 2203/04103* (2013.01)

(56) References Cited

U.S. PATENT DOCUMENTS

2015/0324033 A1* 11/2015 Kim .................. G06F 3/044
                                                 345/174
2016/0216789 A1*  7/2016 Chang ................ G06F 3/041

* cited by examiner

INTERACTIVE HIGH-CLARITY GLASS ELECTRONIC WHITEBOARD

BACKGROUND OF THE INVENTION

Conventional whiteboards for water-based pen are mostly made of plastic material. Their smooth surfaces are light reflective and mono-functional. With the development of science and technology, whiteboards with projection function appeared on the market, which are made of special materials and the reflectance is increased by 20% compared with ordinary projection screens, making the image brighter and clearer and significantly improving projection brightness. However, their manufacturing cost is high and cannot be used as writing boards. It is difficult to promote their use. When the aforesaid materials are used for manufacturing interactive electronic whiteboards, the cheaper one made with a low cost has a poorer touch sensitivity; the more expensive one has a better touch sensitivity, but it has a higher cost. Also, subject to the limitations of materials available, existing whiteboards have many problems. For example, they are susceptible to scratches and breakage; when they are broken, they are totally unusable; their surface reflection is dazzling; they are mainly operated by touching at a single point; and the response is slow and lagged. The market urgently needs a new type of whiteboard which is light, thin, anti-glare and easy to slide, has a low manufacturing cost and a super-hard anti-scratch surface, thereby ensuring smooth writing and makes writing easy to clean.

BRIEF SUMMARY OF THE INVENTION

The present invention aims to provide an interactive high-clarity glass electronic whiteboard with a low manufacturing cost and equipped with a projection function.

The technical proposal achieving the aims of the present invention is an interactive high-clarity glass electronic whiteboard, which includes a writing board body. The writing board body includes a base board and an ultra-thin tempered glass. A front side of the base board attaches with the ultra-thin tempered glass. An attaching surface of the ultra-thin tempered glass attaching with the base board is adhered with a non-transparent interlayer or a non-transparent coating layer. A writing surface of the ultra-thin tempered glass is a matte surface with anti-glare treatment.

For better technical effect, the technical proposal of the present invention can also be modified as follows:

1. The thickness of the ultra-thin tempered glass is 0.3~2 mm, thereby preventing partial superimposition of a word over its shadow and thus achieving better display effects.

2. The front surface of the base board is adhered with the non-transparent coating layer.

2.1 Further, the non-transparent coating layer can be white paint or printing white ink. When the glass with non-reflective and non-transparent white film is attached to a white aluminum board, the screen has a more enhanced white effect.

3. An infrared sensor module is mounted around a surface of the ultra-thin tempered glass.

4. A touch sensing module is adhered between the non-transparent interlayer and the base board.

4.1 Further, the touch sensing module is a capacitive touch sensing module or inductive touch sensing module.

4.1.1 Preferably, the capacitive touch sensing module comprises a transparent plastic film. A front side and a back side of the transparent plastic film are provided with horizontal conductive film lines and vertical conductive film lines respectively.

4.1.1.1 Further, the horizontal conductive film lines and the vertical conductive film lines are made of any one of copper, aluminum, gold, silver and conductive carbon paste.

5. The non-transparent interlayer is a white or beige film which attaches with the ultra-thin tempered glass and the base board respectively. By using a beige or white film as a soft non-transparent interlayer to attach with such materials of high hardness as ultra-thin tempered glass and base board respectively, air bubbles will not be produced. It is therefore not necessary to carry out a process to remove air bubbles, thereby simplifying the manufacturing process.

5.1 Further, the white or beige film surface is a matte surface with anti-glare treatment. The rough white film surface can eliminate and reduce image reflection so that images are projected directly onto the white film and are therefore shown nearer to its original appearance, thereby improving clarity of the images.

6. The non-transparent coating layer is a white ink layer printed on the attaching surface of the ultra-thin tempered glass attaching with the base board. Since the white ink layer is printed on the back of the ultra-thin tempered glass, air bubbles produced during attachment can be directly covered during attachment.

7. The base board is a magnesia board, an aluminum honeycomb panel, a high-density extruded board or a fiber board; the magnesia board, the aluminum honeycomb panel, the high-density extruded board and the fiber board are all not easy to deform and have a high degree of smoothness, thereby lengthening the service life of the writing board.

8. The back of the base board is affixed with a green board for chalk writing.

9. The aluminum honeycomb panel surface is bonded with an aluminum plate. The ultra-thin tempered glass and the green board are attached with the aluminum plate respectively.

9.1 Further, a side that the aluminum honeycomb panel attaches only with the ultra-thin tempered glass is bonded with an aluminum plate. The green board can be directly affixed with the aluminum honeycomb panel to save materials.

10. A frame is also provided, on which the writing board body is mounted in a rotatable manner.

The present invention uses ultra-thin tempered glass with anti-glare treatment as the writing board body materials, which reach a surface hardness of 9H, which is three times the hardness of an ordinary whiteboard film. Therefore the glass is not prone to scratches and has a certain amount of tenacity allowing the glass to be bent to 90 degrees. Also, thinness of the glass can emphasize the fonts more effectively, the matte surface with anti-glare treatment can be used as the projector screen. When the back of the ultra-thin tempered glass is attached to the touch sensing module, the touch function can also be realized, thereby achieving a better interactive experience. When the non-transparent interlayer attached to the attaching surface of the ultra-thin tempered glass attaching with the base board (i.e. the back of the ultra-thin tempered glass) is a white or beige film, the flexible film and the ultra-thin tempered glass will not produce air bubbles; meanwhile, air bubbles produced during attachment when the ultra-thin tempered glass is attached to the base board can be covered; when the non-transparent coating is a white ink layer, air bubbles produced during attachment are directly covered. No additional process for removing air bubbles is required, thereby simplifying the manufacturing process and greatly improving production efficiency.

DETAILED DESCRIPTION OF THE INVENTION

The preferred embodiments of the present invention are further described in detail below with reference to the accompanying drawings.

Embodiment 1

Figure 1:
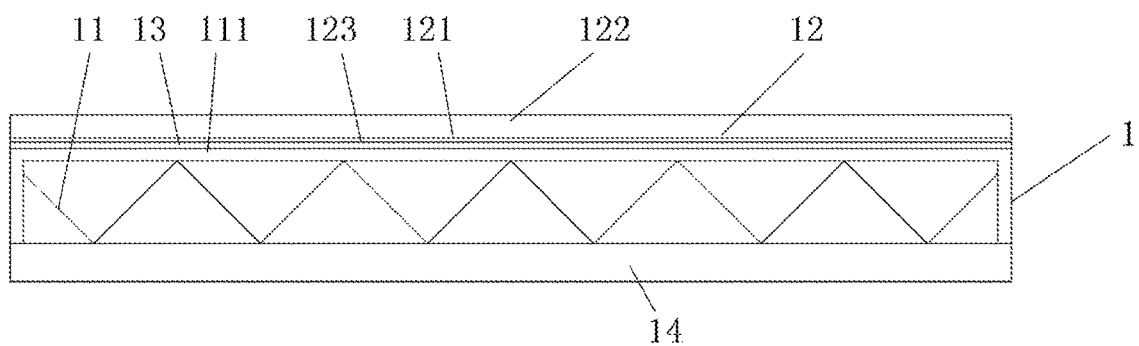
FIG. 1 illustrates the structure of an interactive high-clarity glass electronic whiteboard with capacitive touch sensing module according to embodiment 1 of the present invention.
Figure 2:
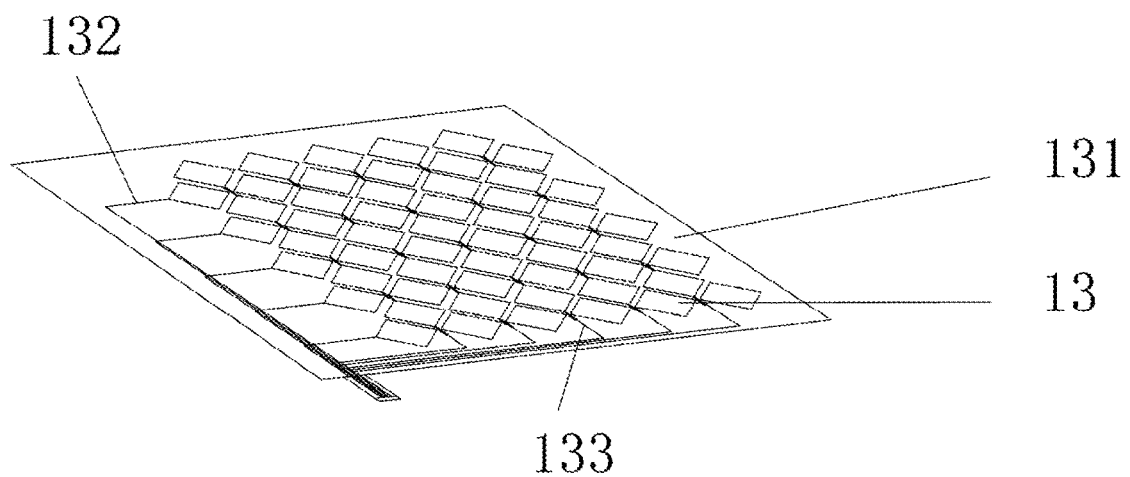
FIG. 2 illustrates the structure of the capacitive touch sensing module of embodiment 1.

As shown in FIG. 1 and FIG. 2, an interactive high-clarity glass electronic whiteboard includes a writing board body 1. The writing board body 1 includes a base board 11, an ultra-thin tempered glass 12 and a capacitive touch sensing module 13. The capacitive touch sensing module 13 is attached with a back side of the ultra-thin tempered glass 12. White ink 123 is printed on an attaching surface 121 of the ultra-thin tempered glass 12 attaching with the capacitive touch sensing module 13. A writing surface 122 of the ultra-thin tempered glass 12 is a matte surface with anti-glare treatment; a front side of the base board 11 attaches with the capacitive touch sensing module 13. A back of the base board 11 is affixed with a green board 14 for chalk writing.

Further, the capacitive touch sensing module 13 comprises a transparent plastic film 131. A front side and a back side of the transparent plastic film are provided with horizontal conductive film lines 132 and vertical conductive film lines 133 respectively.

Further, the base board 11 is an aluminum honeycomb panel. A side of the aluminum honeycomb panel that only attaches with the capacitive touch sensing module 13 is bonded with an aluminum plate 111. The green board 14 is directly affixed with the aluminum honeycomb panel.

Embodiment 2

Figure 3:
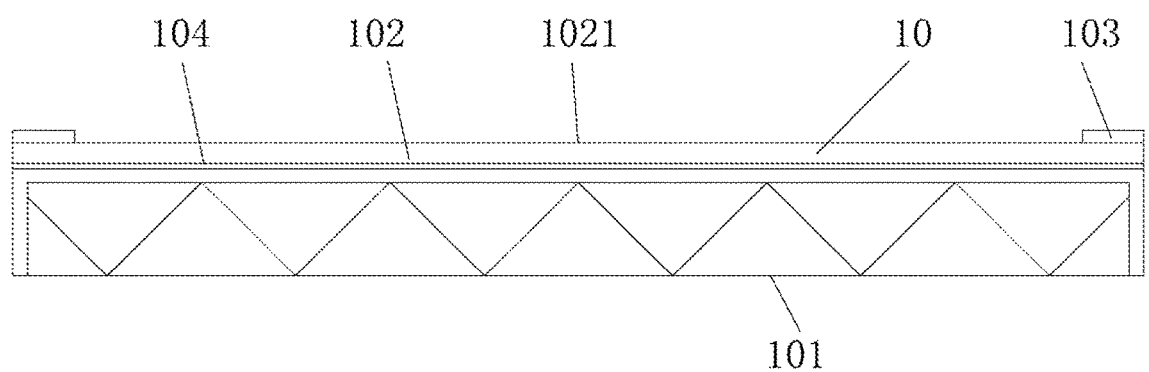
FIG. 3 illustrates the structure of an interactive high-clarity glass electronic whiteboard with infrared sensor module according to embodiment 2 of the present invention.

As shown in FIG. 3, an interactive high-clarity glass electronic whiteboard includes a writing board body 10. The writing board body 10 includes a base board 101 and an ultra-thin tempered glass 102. An infrared sensor module 103 is mounted around a surface of the ultra-thin tempered glass 102. A white film 104 is attached between the ultra-thin tempered glass 102 and the base board 101. The writing surface 1021 of the ultra-thin tempered glass and a surface of the white film 104 are both matte surfaces with anti-glare treatment.

The film between the ultra-thin tempered glass and the base board of the present invention can be beige in color. By using a beige or white film as a soft non-transparent interlayer to attach with the ultra-thin tempered glass, air bubbles will not be produced, and then when the ultra-thin tempered glass is attached to the base board, covering by the non-transparent film blocks air bubbles produced in such attachment to produce a hard screen from being seen on a surface of the screen, so it is not necessary to carry out a process of removing bubbles; the white ink printed on the attaching surface of the ultra-thin tempered glass attaching with the base board directly covers the air bubbles produced in attachment. Therefore it is also not necessary to carry out a process of removing bubbles; when the back of the non-transparent interlayer attaches with the capacitive touch sensing module, the non-transparent interlayer also covers the lines on the film, so the diameter which the conductive film lines span across may be enlarged appropriately. Further, no additional blackening and hiding process is required. The non-transparent interlayer design does not only simplify the manufacturing process but also improve production efficiency.

A thickness of the ultra-thin tempered glass of the present invention is preferably 0.3~2 mm, thereby preventing partial superimposition of a word over its shadow and thus achieving better display effects; a frame can also be provided to surround the outer boundaries of the writing board, making the writing board better in appearance and having a higher stability; the material of the base board is not limited to the aluminum honeycomb panel. It can also be a board material which is not easy to deform and have a high degree of smoothness, such as a magnesia board or a high-density extruded board; capacitive touch sensing module may have a structure not limited to the embodiments as well. It can be an ordinary ITO conductive layer or a GG touch panel. The horizontal conductive film lines and the vertical conductive film lines are made of any one of copper, aluminum, gold, silver, and conductive carbon paste; when the present invention uses an infrared sensor module to realize the touch function, the manufacturing cost can be greatly reduced; the interactive high-clarity glass electronic whiteboard of the present invention has a light weight. It can be directly mounted on a frame and flip sides manually. It can also be mounted on a support in a rotatable manner.

What is claimed is:
1. An interactive high-clarity glass electronic whiteboard, comprising:
   a writing board body, wherein the writing board body comprises a base board, an ultra-thin tempered glass having an attaching surface, and a touch sensing module;
   a first side of the base board attached to the touch sensing module;
   an ink layer printed on the attaching surface of the ultra-thin tempered glass, the ink layer comprising a non-transparent interlayer;
   the ultra-thin tempered glass further comprising a writing surface of the interactive high-clarity glass electronic whiteboard, the writing surface opposite of the attaching surface, and the writing surface of the ultra-thin tempered glass comprising a matte surface having an anti-glare treatment;
   wherein the non-transparent interlayer is a film having a color chosen from a list of white or beige, the film attached to the ultra-thin tempered glass and the attaching surface;
   wherein the film has a surface which is a matte surface with an anti-glare treatment; and
   wherein the base board comprises an aluminum honeycomb panel and a surface of the aluminum honeycomb panel is bonded with an aluminum plate and wherein the ultra-thin tempered glass and a green board are attached to the aluminum plate respectively.

2. The interactive high-clarity glass electronic whiteboard of claim 1, wherein the ultra-thin tempered glass comprises a thickness of 0.3 mm to 2 mm.

3. The interactive high-clarity glass electronic whiteboard of claim 1, wherein the first side of the base board is adhered to a nontransparent coating layer.

4. The interactive high-clarity glass electronic whiteboard of claim 1, wherein an infrared sensor module is mounted on a mounting surface of the ultra-thin tempered glass.

5. The interactive high-clarity glass electronic whiteboard of claim 1, wherein the touch sensing module is adhered between the non-transparent interlayer or a non-transparent coating layer and the base board.

6. The interactive high-clarity glass electronic whiteboard of claim 5, wherein the touch sensing module is a touch sensing module selected from a list comprising capacitive touch sensing module and inductive touch sensing module.

7. The interactive high-clarity glass electronic whiteboard of claim 6, wherein the capacitive touch sensing module comprises a transparent plastic film having a front side and a back side, and wherein the front side and the back side of the transparent plastic film further comprise horizontal conductive film lines and vertical conductive film lines respectively.

8. The interactive high-clarity glass electronic whiteboard of claim 1, wherein a non-transparent coating layer is a white ink layer printed on the attaching surface of the ultra-thin tempered glass attaching the base board.

9. The interactive high-clarity glass electronic whiteboard of claim 1, further comprising a green board affixed to a back side of the base board.

10. The interactive high-clarity glass electronic whiteboard of claim 1, wherein the base board comprises a board type chosen from a list of magnesia board, aluminum honeycomb panel, high-density extruded board, and fiber board.

11. The interactive high-clarity glass electronic whiteboard of claim 10, wherein a side of the aluminum honeycomb panel is bonded to the ultra-thin tempered glass with an aluminum plate.

* * * * *